(12) United States Patent
Patil et al.

(10) Patent No.: US 9,405,838 B2
(45) Date of Patent: Aug. 2, 2016

(54) DETERMINING AN ACTIVE PERSONA OF A USER DEVICE

(71) Applicant: Quixey, Inc., Mountain View, CA (US)

(72) Inventors: Sameer Patil, Santa Ana, CA (US); Eric J. Glover, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 182 days.

(21) Appl. No.: 14/446,991

(22) Filed: Jul. 30, 2014

(65) Prior Publication Data

US 2015/0186535 A1   Jul. 2, 2015

Related U.S. Application Data

(60) Provisional application No. 61/921,245, filed on Dec. 27, 2013.

(51) Int. Cl.
*G06F 7/00*   (2006.01)
*G06F 17/30*  (2006.01)

(52) U.S. Cl.
CPC .... *G06F 17/30867* (2013.01); *G06F 17/30622* (2013.01)

(58) Field of Classification Search
CPC ................................................ G06F 17/30867
See application file for complete search history.

(56) References Cited

U.S. PATENT DOCUMENTS

2003/0191753 A1 * 10/2003 Hoch ................ G06F 17/30867
2006/0074883 A1    4/2006 Teevan et al.
2011/0225048 A1    9/2011 Nair

OTHER PUBLICATIONS

International Search Report and Written Opinion for related PCT Application No. PCT/US2014/065184 dated Feb. 17, 2015.
A. Pentland, "Automatic mapping and modeling of human networks", Physica A: Statistical Mechanics and its Applications, vol. 378, Issue 1, 2007. 05, pp. 59-67.
Stephen Wong et al., "A Stochastic Framework for Evaluating Seizure Prediction Algorithms Using Hidden Markov Models", Journal of Neurophysiology, Mar. 1, 2007, vol. 97, No. 3.
Reza Haghighi Osgouei et al., "Modeling and Recognition of Human Driving Behavior Using Hidden Markov Models", Journal of KIISE, vol. 38, No. 2(B), 2011.11, pp. 323-326.

* cited by examiner

*Primary Examiner* — Ajith Jacob
(74) *Attorney, Agent, or Firm* — Harness, Dickey & Pierce, P.L.C.

(57) ABSTRACT

A method for determining an active persona of a user device includes determining a first user device state of a user device. The active persona is indicative of a predicted objective of the user of the user device. The first state defines an action currently being performed on the user device and a set of observations corresponding to the user device. The method includes inputting the first user device state to a model and determining the active persona of the user device based on the output of the model. The model is configured to receive a user device state and outputs probability values associated with one or more clusters, each cluster being indicative of one or more items of interest corresponding to the user device. The method further includes performing a procedure using the active persona of the user device.

26 Claims, 5 Drawing Sheets

DETERMINING AN ACTIVE PERSONA OF A USER DEVICE

CROSS REFERENCE TO RELATED APPLICATIONS

This U.S. patent application claims priority under 35 U.S.C. §119(e) to U.S. Provisional Application 61/921,245, filed on Dec. 27, 2013, which is hereby incorporated by reference in its entirety.

TECHNICAL FIELD

This disclosure relates to methods and apparatuses for determining an active persona of a user device.

BACKGROUND

User devices, such as smartphones, tablet PCs, cellular telephones, and portable digital assistants have become widespread and essential in consumers' everyday lives. Moreover, users personalize their user devices by downloading applications to their device or accessing applications via a webbrowser. Each user device can have multiple users, and each user can use the device for a number of different reasons. For example, a user can use a user device for playing games, watching movies, listening to music, checking financial information, editing documents, and messaging friends.

SUMMARY

One aspect of the disclosure provides a method for determining an active persona of a user device. The active persona is indicative of a predicted objective of the user of the user device. The method includes determining a first user device state of a user device. The first state defines an action currently being performed on the user device and a set of observations corresponding to the user device. The method further includes the first user device state to a model and determining the active persona of the user device based on the output of the model. The model is configured to receive a user device state and outputs probability values associated with one or more clusters, each cluster being indicative of one or more items of interest corresponding to the user device. The method further includes performing a procedure using the active persona of the user device. The method can be performed by a processing device.

Implementations of the disclosure may include one or more of the following optional features. In some implementations, the method includes capturing a second user device state of the user device and updating the model based on the first user device state and the second user device state. The second user device state is subsequent to the first user device state and defines a subsequent action being performed on the user device and one or more subsequent observations. In some examples, the model is a Hidden Markov Model.

The first user device state may be based on an active process of the user device. In some implementations, the active process is one of an active application being executed by the user device, and active media content being played by the user device, or an active search query being provided by the user device. Determining the first user device state may include using an inverted index to determine an active cluster to which the active process corresponds. The cluster is indicative of an active item of interest corresponding to the user device.

In some examples, the method further includes determining a plurality of items of interest of the user device, providing the plurality of items of interest to a persona server, and receiving Determining the first user device state may include obtaining output values of one or more peripheral devices of the user device. Performing a procedure using the active persona may include providing the active persona to a search engine as part of a search query, providing the active persona to an application server in communication with the user device, or arranging a home screen of the user device based on the active persona.

The active persona may be a vector indicating a plurality of probabilities output by the model. Each element of the vector may device will transition from a current item of interest to associated with the probability value provide a probability of transitioning from the first state to a second state. In these implementations, each element of the vector corresponds to a different state. Obtaining the active persona may include obtaining a vector indicating a plurality of probabilities from the model and mapping the vector to a category based on one or more rules.

Another aspect of the disclosure provides a user device that determines its active persona. The user device includes a storage device including one or more computer readable mediums that store a model that receives a user device state and outputs probability values associated with one or more clusters. Each cluster is indicative of one or more items of interest corresponding to the user device. The user device further includes a processing device executing computer readable instructions. When executed by the processing device, the computer-readable instructions cause the user device to determine a first user device state of a user device, feed the first user device state to the model, obtain an active persona of the user device based on the output of the model, and perform a procedure using the active persona. The first user device state defines an action currently being performed on the user device and a set of observations corresponding to the user device. The active persona is indicative of a predicted objective of the user of the user device. This aspect may include one or more of the following optional features.

According to some implementations of the present disclosure, the computer readable instructions further cause the processing device to capture a second user device state after determining the active persona of the user device and to update the model based on the first user device state and the second user device state. The second user device state is subsequent to the first user device state and defines a subsequent action being performed on the user device and one or more subsequent observations. In some examples, the model is a Hidden Markov Model.

According to some implementations, the action being performed by the user device is based on an active process of the user device. The active process is one of an active application being executed by the user device, an active media content being played by the user device, or an active search query being provided by the user device.

In some implementations, determining the first user device state includes determining an active cluster to which the active process corresponds using an inverted index. The active cluster is indicative of an active item of interest corresponding to the user device. In some of these implementations, the computer readable instructions further cause the processing device to determine a plurality of items of interest of the user device, provide the plurality of items of interest to a persona server, and to Determining the first user device state may include obtaining output values of one or more peripheral devices of the user device. Performing a procedure using the active persona may include providing the active persona to a search engine as part of a search query, providing the active persona to an application server in communication with the user device, or arranging a home screen of the user device based on the active persona.

The active persona may be a vector indicating a plurality of probabilities output by the model. Each element of the vector may indicate a probability that the user device will transition from a current item of interest to a cluster associated with the probability value that contains a second item of interest. In these implementations, each element of the vector corresponds to a different state. Obtaining the active persona may include obtaining a vector indicating a plurality of probabilities from the model and mapping the vector to a category based on one or more rules.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
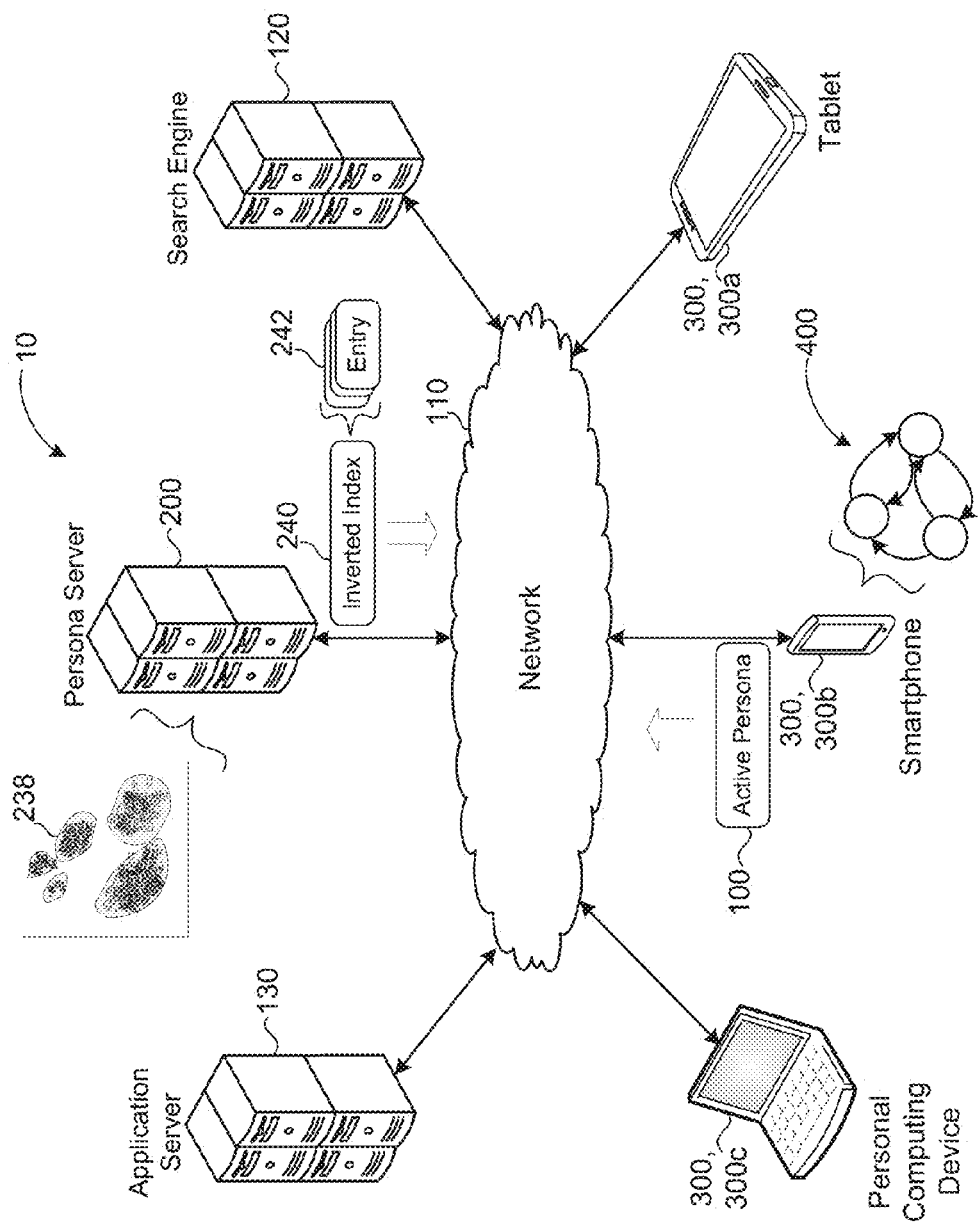
FIG. 1 is a drawing illustrating an example system of devices for determining and using an active persona of a user device.
Figure 2:
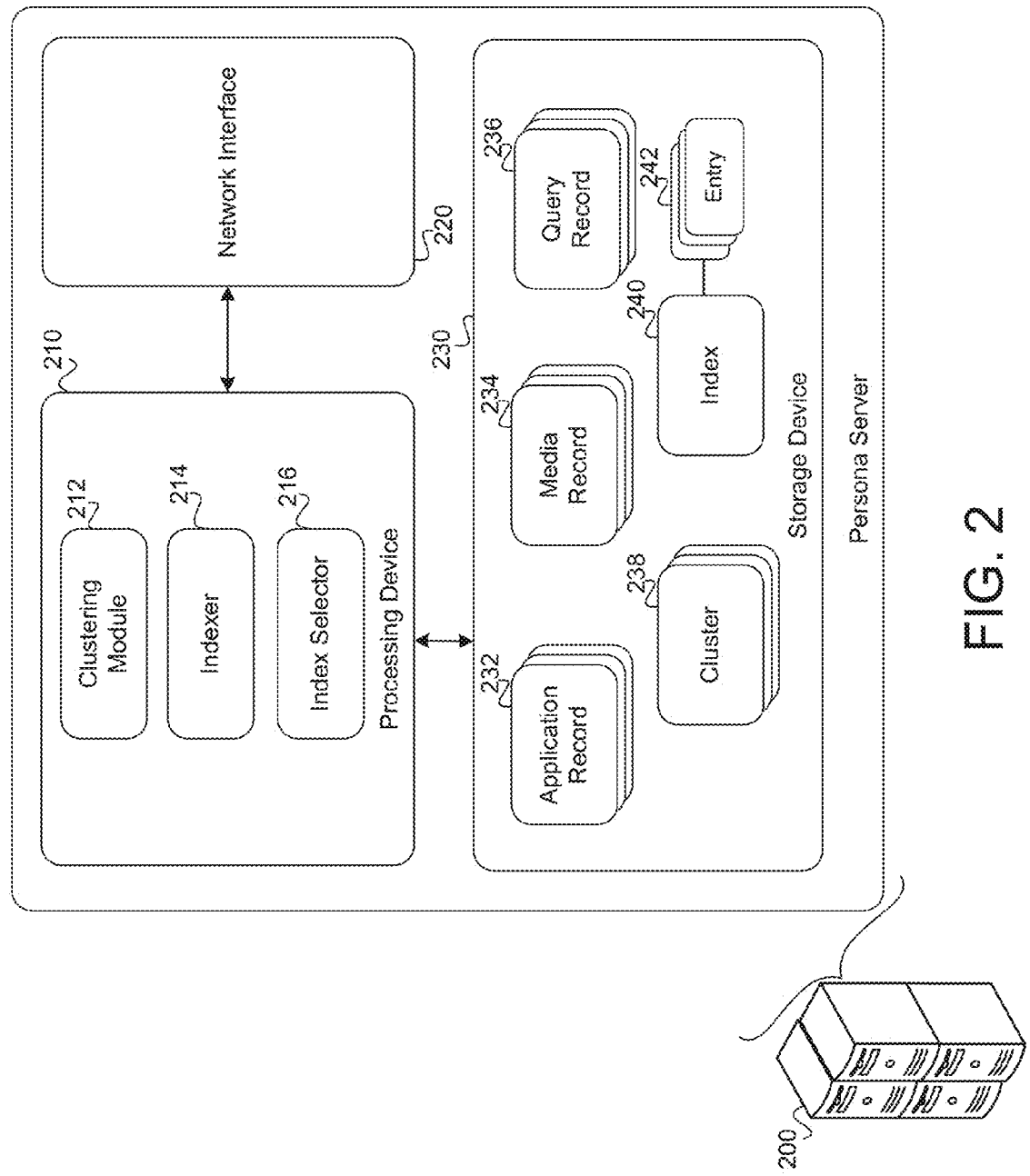
FIG. 2 is a schematic illustrating example components of a persona server.
Figure 3:
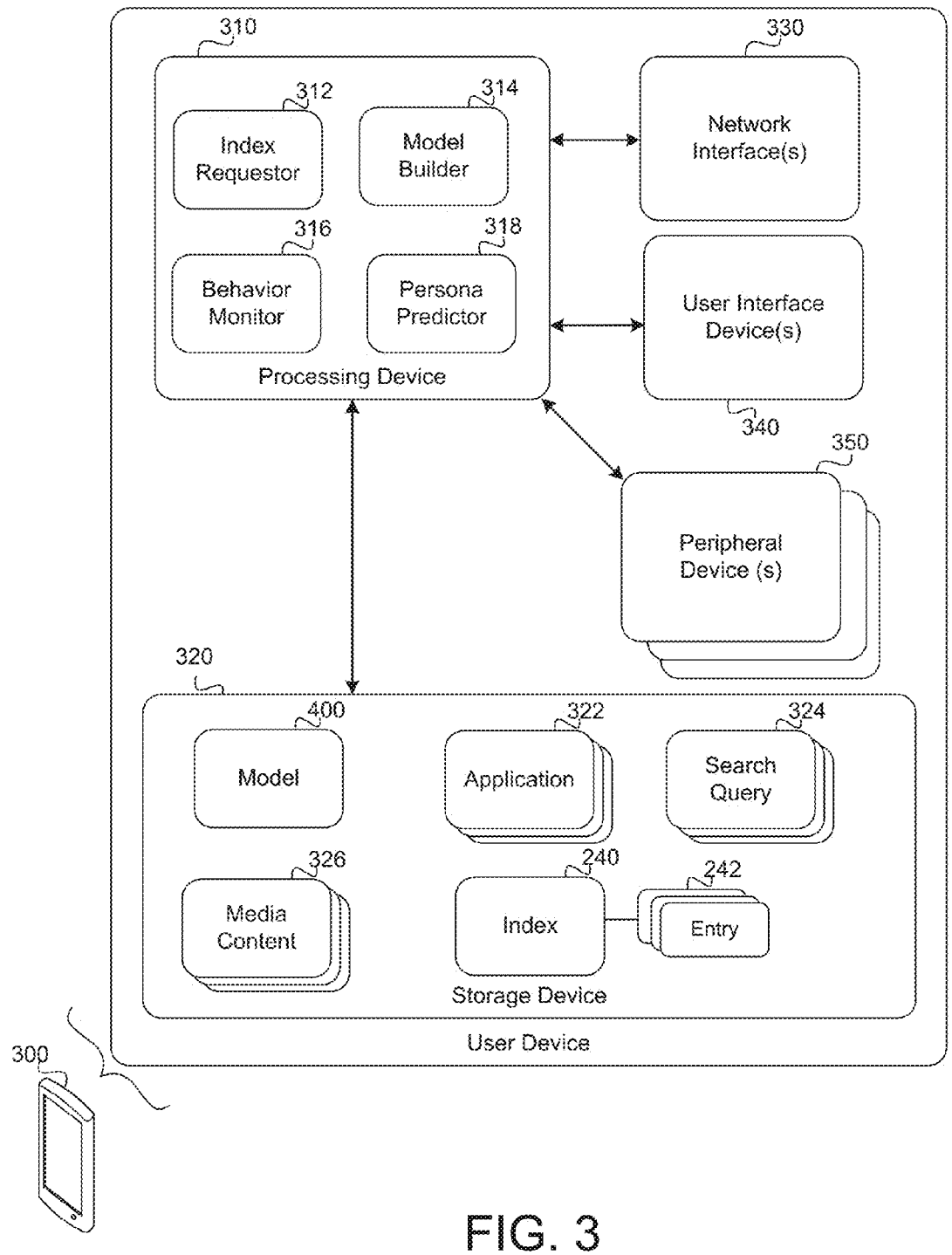
FIG. 3 is a schematic illustrating example components of a user device.

FIGS. 1-3 illustrate an example system 10 for predicting an active persona 100 of a user device 300 and the components thereof. The system 10 can include a persona server 200 (FIG. 2) and one or more user devices 300 (FIG. 3) in communication with a network 110. In some implementations, the persona server 200 is configured to provide data that allows a user device 300 to determine its active persona 100. An active persona 100 of a user device 300 can be indicative of an objective of a user of the device 300 at a time when the user is using the device 300. A user device 300 can have one or more users and each user can have one or more objectives when using the device 300. For example, a family having a mother, a father, and a child may all use the same tablet computer 300a. The father may use the tablet computer 300a for reading the news in the mornings (e.g., "news objective"), watching sports in the evenings (e.g., "sports fan objective"), and playing violent video games at night (e.g., "mature video game objective"). The mother may use the tablet computer 300a for scheduling tasks in the mornings (e.g., "planning objective") and checking stocks in the evening (e.g., "finance objective"). Finally, the child may use the tablet computer 300a for watching child-appropriate movies in the afternoons (e.g., "child movie watcher objective") and playing educational games in the evening (e.g., "educational game objective"). The explicit objectives provided above are provided for example only. Further, the foregoing examples are trends and not necessarily always adhered to by the users. The user device 300 utilizes the data and a user device state of the user device 300 to predict the active persona 100 of the user device 300. The user device state can include an action currently being performed on the user device 300 (e.g., an active application currently being used on the user device 300, an active media content 326 being played by the user device 300, or an active search query 324 being provided by the user device 300) and a set of observations corresponding to the user device 300 (e.g., a location of the user device 300, a speed of the user device 300, a day of the week, a time of the day). The user device 300 can use the active persona to perform a procedure, such as communicating the active persona 100 to a service provider or rearranging the user home screen based on the active persona 100.

By knowing (or likely knowing) the active persona 100 of the device 300, service providers, such as search engines 120, application providers 130, and advertisers, can provide more relevant content to the user. Search engines 120 can utilize an active persona 100 of a user to increase the relevancy of search results. For example, if the user device 300 provides a search query 324 of "schedules," a search engine 120 can provide better results to the user device 300 if it knows the active persona 100 of the user device 300. In particular, the search engine 120 cannot decipher what the user means when entering the term "schedules." By having a prediction as to the active persona 100 of the user, the search engine 120 can better understand the user's intentions when he or she enters the term "schedules." Drawing from the example above, the search engine 120 can return a list of applications that provide schedules of the major sports leagues (e.g., NFL, MLB, NHL, and NBA) when the active persona 100 corresponds to that of a sports fan. Similarly, when the active persona 100 of the device 300 corresponds to that of a "planner," then the search engine 120 can return a list of applications that are directed to scheduling tasks and appointments. The active persona 100 of the device 300 can also help services determine which advertisements to transmit to the device 300. For example, if the active persona 100 is "violent video game persona," a video streaming service can embed an advertisement for a new first person shooter game. Similarly, if the active persona 100 is "children's games persona," an application server 130 can transmit an advertisement for a new blockbuster cartoon movie. The foregoing examples are not intended to limit the uses of active personas 100 of a device 300.

In some implementations, the persona server 200 and a user device 300 work in combination to determine an active persona 100 of the device 300. The persona server 200 can identify clusters 238 that are used to identify potential active personas 100 of a device 300. A cluster 238 can refer to a group of data records that have one or more similar attributes. In some implementations, each cluster 238 contains the same type of data records. Examples of data records can include, but are not limited to, application data records, query data records, and media data records.

In some implementations, the persona server 200 identifies clusters 238 of similar applications 322, search queries 324, or media contents 326. Clusters 238 are clustered based on the attributes of the data records being clustered. For instance, the persona server 200 can cluster the application records according to the application publisher, application type, application subtype, the ratings of the applications, and the popularity of the applications. Similarly, the persona server 200 can cluster the query records according to the actual query, the location of the query, and the action taken in response to the query results.

When the persona server 200 identifies a cluster 238, the persona server 200 can also assign a cluster identifier ("cluster ID") to the identified cluster 238. Each cluster ID corresponds to a single cluster 238 and each cluster 238 has only one cluster ID. As more data records are added to a cluster 238, the make-up of the cluster 238 changes, but the cluster ID of the cluster 238 should remain the same.

In some implementations, the persona server 200 is further configured to indexes 240 corresponding to the clusters 238. In some implementations, the indexes 240 are inverted indexes that associate a data record to the cluster IDs of the clusters 238 to which the data record belongs. In some implementations, an inverted index of a particular item may be represented in the following form: <ITEM_ID→[cluster_ID1, cluster_ID2, . . . cluster_ID_n], where there are n clusters that are associated with the particular item. For instance, if a certain application (e.g., the ANGRY BIRDS® application by Rovio Games) belongs to two different clusters 238 ("Published By Rovio" and "Popular Games"), the two different clusters 238 can be indexed to the data record of certain applications. In some implementations, each cluster in the inverted index may have a weight associated therewith. For example, an example inverted index of a particular item may be represented in the following form: <ITEM_ID→ [(cluster_ID1, weight1), cluster_ID2, weight2), . . . cluster_ID_n, weight_n)], where there are n clusters that are associated with the item. Each weight may be a value indicating a relative importance of the cluster to a given item (e.g., relative to all other possible item-cluster tuples).

In some implementations, the persona server 200 provides some or all of the indexes 240 to the user devices 300. In some of these implementations, the persona server 200 selects the indexes 240 that are provided to the user devices 300 based on items of interest of each user device 300. Examples of items of interest can include applications of the user device 300, queries/logs of the user device 300, and histories of media contents 326 played on the user device 300. The user device 300 provides the list of the items of interest (or data that is indicative of the items of interest) to the persona server 200 and the persona server 200 transmits the indexes 240 relevant to the items of interest.

The user device 300 can utilize the indexes 240, the user device state of the user device 300, and one or more machine learned models 400 to predict an active persona 100 of the user. In some implementations, each user device 300 monitors itself and creates/updates models 400 that predict the active persona 100 of the device 300 based on the actions being performed by the user device and the observations of the user device 300 at a given time. In some implementations, the machine learned model 400 is a Hidden Markov Model ("HMM"). Other types of machine learned models 400 may be implemented as well. For example, the user device 300 can create/update a Bayesian model to predict the probabilities of each state.

A machine learned model 400 receives a user device state as input (e.g., an action being performed on the user device 300, a current time, a day of the week, accelerometer readings, current active application, most recent search query 324 sent by the user device 300) and outputs one or more predicted clusters 238. In some implementations, each predicted cluster 238 includes a score (e.g., a probability) indicating a likelihood that the user device 300 is in the predicted cluster 238. Thus, in some implementations, an active persona 100 can be represented by a vector of probabilities. For example, an active persona may be defined by the following vector, $AP(C_j)=[S_0C_0, S_1C_1, S_2C_2, \ldots, S_nC_n]$, where AP is the active persona 100 and $S_i$ is the probability that the user device will transition from an item of interest in the jth cluster, $C_j$, to an item of interest contained in the ith cluster, $C_j$. Additionally or alternatively, the active persona 100 can be represented by a category to which the vector of probabilities maps or matches.

When the user device 300 determines an active persona 100, the user device 300 can communicate the active persona 100 to the persona server 200 or another server (e.g., a search engine 120 or an application server 130). Furthermore, the user device 300 can take actions based on the predicted active persona 100. For instance, if the user device 300 predicts that the active persona 100 is likely game related (e.g., the most likely transition or transitions is/are to a cluster corresponding to a game), the user device 300 can reconfigure its home screen of the user device 300 to display icons and widgets of gaming applications. Similarly, if the user device 300 predicts that the active persona 100 is likely business related, the user device 300 can reconfigure its home screen to display icons and widgets of business related applications.

While the persona server 200 may be configured to determine the active persona 100, the user device 300 can be used to determine the active persona 100 so that the user device 300 maintains the model 400. In this way, the user's information such as locations and habits do not need to be exported from the user device 300, thereby maintaining the user's privacy. Furthermore, when transmitting the active persona 100 of the user to a remote device (e.g., a third party server), the user device 300 can conceal the identity of the user and/or the user device 300 before transmitting the active persona 100.

FIG. 2 illustrates an example of a persona server 200. In some implementations, the persona server 200 is a system of one or more computing devices. The persona server 200 may be further integrated into a larger computing system, such as a search engine 120, an application server 130, or an ad server. In an example implementation, the persona server 200 includes a processing device 210, a network interface 220, and a storage device 230. The processing device 210 can execute a clustering module 212, an indexer 214, and an index selector 216, all of which can be implemented as computer-readable instructions.

The processing device 210 includes one or more physical processors that execute computer-readable instructions (e.g., executable computer code) in communication with a memory device (e.g. RAM and/or ROM) that stores the computer-readable instructions. In implementations where the processing device 210 includes two or more processors, the two or more processors can operate in an individual or distributed manner. In some implementations, some of the executed components are implemented at different physical devices or locations. For instance, the clustering module 212 may execute at a first location/device and the indexer 214 and the index selector 216 may execute at a second location/device.

The network interface device 220 includes one or more devices that can perform wired or wireless (e.g., Wi-Fi or cellular) communication. Examples of the network interface device 220 include, but are not limited to, a transceiver configured to perform communications using the IEEE 802.11 wireless standard, an Ethernet port, a wireless transmitter, and a universal serial bus (USB) port.

The storage device 230 can include one or more computer readable storage mediums (e.g., hard disk drives and/or flash memory drives). The storage mediums can be located at the same physical location or device or at different physical locations or devices. The storage device 230 can store application records 232, query records 236, media content records 234, clusters 238, and indexes 240.

Application data records 232 correspond to known (e.g., previously discovered) applications. An application can refer to computer readable instructions that cause a computing device to perform a task. In some examples, an application may be referred to as an "app." Example applications include, but are not limited to, word processing applications, spreadsheet applications, messaging applications, media streaming applications, social networking applications, and games.

Each application data record 232 can include application metadata that defines the attributes of the application. Examples of attributes of an application can include, but are not limited to, a name of the application, an operating system that the application is programmed for, a number of downloads of the application, a popularity of the application, a type of the application, a subtype of the application, a rating of the application, a publisher of the application, an expected usage amount of the application, and a number of uninstalls of the application.

Query data records 236 correspond to previously received search queries 324. The search queries 324 can be received by a search engine 120 associated with the persona server 200 or from a third-party source. Each query data record 236 can include query metadata that defines attributes of a search query 324. Examples of attributes of a search query 324 can include, but are not limited to, the query itself, a geographic location of the user device 300 providing the query, and an action taken in response to the query (e.g., what the user selected).

Media content records 234 correspond to known media contents (e.g., movies, songs, albums, TV shows). Each media content record 234 can include media metadata that defines the attributes of the media content. Examples of attributes of a media content can include, but are not limited to, a name of the media content, a type of the media content, a genre of the media content, a format of the media content, an author of the media content, a publisher of the media content, a popularity of the media content, a rating of the media content, and a length of the media content.

The clustering module 212 clusters data records. The clustering module 212 receives as input a set of data records to be clustered and may further receive a list of one or more attributes by which to cluster the data records. The output of the clustering module 212 is one or more clusters 238. The outputted clusters 238 may identify the members (i.e., data records) of the cluster 238. The clustering module 212 can execute any clustering algorithm, such as k-nearest neighbors, k-means clustering, bi-clustering, or text-based clustering. The clustering module 212 can cluster each set of the application records 232, the query records 236, and the media records 234 individually. That is, the clustering module 212 clusters the application records 232 with other application records 232, query records 236 with other query records 236, and media records 234 with other media records 234. The attributes that the clustering module 212 uses to cluster the data records can be manually selected by a human or can be learned using a statistical process, such as principal component analysis (PCA).

The clustering module 212 can cluster the data records in any suitable manner. In some implementations, the clustering module 212 can initially cluster data records into general "category clusters." During this type of clustering, the clustering module 212 can produce several high-level clusters 238 based on all available information. The information by which the clustering module 212 clusters the data records can include metadata contained in the data records 232, 236, 238 (e.g., the attributes collected from $3^{rd}$ party sources or manually added to the records). In some implementations, this type of clustering can be done in a supervised manner, whereby a user manually selects the attributes, or representative data records by which the data records are clustered. Furthermore, the clustering module 212 can cluster each cluster 238 into sub-clusters 238. When the clustering module 212 completes clustering the general clusters 238, the clustering module 212 can continue to cluster each cluster 238 to identify as many levels as desired. Furthermore, the clusters 238 do not need to make "human sense." Put another way, the relationships between data records in a sub-cluster 238 do not need to be readily apparent to a human observer.

In some implementations, the clustering module 212 can identify possible clusters 238 by leveraging user activity. For example, the clustering module 212 can focus on items of interest to a given geo-region. Such clustering can be done by levels, whereby the clustering module 212 begins clustering based on country, then based on state/province, then urban area, then a particular postal code (if useful). In addition to geo-region, the clustering module 212 can identify clusters 238 of data records that are common to a group of users based on general collaborative filtering. In these scenarios, the clusters 238 can be identified using anonymized data (i.e., data which cannot be attributed to any particular user).

In some implementations, the clustering module 212 can identify application specific clusters 238. In these implementations, the clustering module 212 can group application data records 232 with a common publisher, developer, or franchise (e.g., all of the applications in the ANGRY BIRDS® series). Further, the clustering module 212 can group application data records 232 that are related to a common franchise (e.g., include applications with cheat codes for ANGRY BIRDS®, or ANGRY BIRDS® wallpaper themes).

In some implementations, the foregoing clusters 238 can be subdivided based on other attributes. The clusters 238 can be divided according to, for example, current popularity, long-term popularity, or price. The clustering module 212 can produce many sets of overlapping clusters 238. For example, clusters 238 relating to "Rovio applications" may have a large amount of overlap with a cluster 238 relating to the "ANGRY BIRDS*" franchise.

The clustering module 212 further provides a cluster ID to each newly identified cluster 238. The clustering module 212 can be configured to determine whether the cluster 238 is newly formed or merely updated with new data records. If the cluster 238 is newly formed, the clustering module 212 generates a new cluster ID. The cluster ID can be any unique identifier, such as a string of alphanumeric characters. If a cluster 238 is preexisting and merely being updated, the clustering module 212 does not generate a new cluster ID. The cluster IDs may or may not have properties associated therewith. For example, a "publisher=Rovio" property or a "popular games" property may be associated with the cluster ID. Furthermore, the clustering module 212 can assign a version to each cluster 238. In this way, when a cluster 238 is updated, the clustering module 212 can increase the version number of the cluster 238. The version can be used to differentiate personas generated from now outdated clusters 238 if clusters 238 change over time (e.g., currently popular games). Additionally or alternatively, the clustering module 212 can merge clusters 238 with very high overlap (e.g., more than 80% or 85% overlap) in order to reduce the index size.

The indexer 214 creates the index 240 based on the identified clusters 238. In some implementations, the index 240 is an inverted index. For each data record, the indexer 214 identifies the clusters 238 to which the data record belongs and creates an index entry 242 based on the cluster IDs of the identified clusters 238 and an identifier of the data record (e.g., a record ID). For instance, if a data record "XYZ" is a member of "cluster_A" and of "cluster_B," the inverted index entry 242 of data record XYZ is "XYZ: {cluster_A, cluster_B}."

In some implementations, the index selector 216 determines which index entries 242 to transmit to a device 300. The index selector 216 can select the index entries 242 to transmit in any suitable manner. In some implementations, the index selector 216 can receive indicators of items of interest of a user device 300 from the user device 300. An item of interest can include a list of applications 322 executed/accessed by the device (referred to "a list of applications"), list of search queries 324 provided by the user device 300 (referred to as "list of search queries), and/or a list of media contents 326 played by the user device 300 (referred to as a "list of media contents 326). The index selector 216 can retrieve the index entries 242 corresponding to each of the items of interest. Further, in some implementations, the index selector 216 can cull the index entries 242 based on a number of factors to reduce the number of index entries 242 that are transmitted to the user device 300 in the index 240. For example, the index selector 216 keeps index entries 242 that contain clusters 238 which match to at least a minimum number of user devices 300. For example, if a particular application, search query, or media content is extremely rare, then the index selector 216 does not include the index entry 242 corresponding to the rare application, search query, or media content in the index 240 that the index selector 216 transmits to the user device 300.

In some implementations, the index selector 216 receives values from the device 300, whereby the values are indicative of two or more applications 322, two or more search queries 324, and/or two or more media contents 326. In these implementations, the actual contents of the transmitting device 300 (i.e., the exact applications installed on the device 300 or recent search queries 324 transmitted from the device 300) are obscured from the persona server 200. The transmitting user device 300 can determine the values using, for example, a hash table or a bit mask. In such a scenario, the server 200 can maintain a reverse lookup table that determines possible applications 322, search queries 324, and/or media contents 326 that correspond to a received value. The server 200 can then retrieve the index entries 242 of the possible applications 322, search queries 324, and/or media contents 326. In some implementations, the index selector 216 can cull the index entries 242 that are transmitted to the user device 300.

FIG. 3 illustrates an example of a user device 300 configured to predict an active persona 100. The example user device 300 can include a processing device 310 in communication with a storage device 320, a network interface 330, a user interface 340, and one or more peripheral devices 350. A user device 300 can include other components not shown without departing from the scope of the disclosure.

The processing device 310 can include one or more processors that execute computer-executable instructions and associated memory (e.g., RAM and/or ROM) that stores the computer-executable instructions. In implementations where the processing device 310 includes more than one processor, the processors can execute in a distributed or individual manner. The processing device 310 can execute an index requestor 312, a model builder 314, a behavior monitor 316, and a persona predictor 318, all of which can be implemented as computer-readable instructions.

The storage device 320 can include one or more computer-readable mediums (e.g., hard disk drive or flash memory drive). The storage device 320 can be in communication with the processing device 310, such that the processing device 310 can retrieve any needed data therefrom. The storage device 320 stores the index 240 that the user device 300 receives from the persona server 200 and one or more models 400. The storage device 320 can further store applications 322, previous search queries 324, and media contents 326.

The network interface 330 includes one or more devices that are configured to communicate with the network 110. The network interface 330 can include one or more transceivers for performing wired or wireless communication. Examples of the network interface 330 can include, but are not limited to, a transceiver configured to perform communications using the IEEE 802.11 wireless standard, an Ethernet port, a wireless transmitter, and a universal serial bus (USB) port.

The user interface 340 includes one or more devices that receive input from and/or provide output to a user. The user interface 340 can include, but is not limited to, a touchscreen, a display, a QWERTY keyboard, a numeric keypad, a touchpad, a microphone, and/or speakers.

Peripheral devices 350 are hardware components that are included in the user device 300 to perform specific functions. The user device 300 can have any number of peripheral devices 350, including an accelerometer, a gyroscope, a global positioning system (GPS) module, a camera, a video camera, and/or a thermometer.

The index requestor 312 requests an index 240 from the persona server 200. In some implementations, the index requestor 312 scans the user device 300 for items of interest. Items of interest can include applications 322 installed (native apps) or accessed (web apps) on the user device 300, search queries 324 sent by the device 300 to a search engine 120, and media contents 326 stored on or immediately accessible to the user device 300. In some implementations, the index requestor 312 partially obscures each item of interest to protect the privacy of the user or users of the user device 300. For instance, the index requestor 312 can apply a lossy hash function to an indicator of an item of interest. Additionally or alternatively, the index requestor 312 can apply a bit mask to one or more bits of the indicator. The index requestor 312 transmits the indicators of the items of interest to the persona server 200. In some implementations, the index requestor 312 can include one or more timestamps with each indicator. For example, for an item of interest, a timestamp can indicate when the item of interest was loaded onto the device 300 (e.g., when an application 322 was installed or a media content 326 was downloaded), when the item of interest was originated from the device 300 (e.g., when a search query 324 was transmitted from the device 300), and/or when the item of interest was last used (e.g., the last time the application 322 was launched, the media content 326 was played, or the search query 324 was sent to a search engine 120). In response, the persona server 200 returns an index 240 corresponding to the items of interest. Put another way, the persona server 200 can return an index 240 containing index entries 242 that are keyed by the items of interest of the user device 300. The index requestor 312 can receive the index 240 and store the received index 240 on the storage device 320.

The model builder 314 generates and updates one or more machine learned models 400 used to predict the active persona 100 of the device 300. In some implementations, the machine learned model 400 is a Hidden Markov Model (HMM) or a Bayesian model. The model builder 314 initially creates the model 400 based on the possible user device states of the user device 300 and updates the model 400 as the user device 300 is used by one or more users. The user device states can correspond to the various clusters 238 that the user's actions may implicate. For example, the applications 322 that the user device 300 launches, the media contents 326 that the user device 300 plays, and the search queries 324 that the user device 300 outputs can implicate various cluster IDs of clusters 238 identified in the index 240. The implicated clusters 238 may be indicative of the active persona 100 of the user device 300.

The model 400 predicts a transition from the current cluster implicated by the user device state of the user device 300 based on the current user device state of the device 300. The model 400 can take into account current observations as well as how the user device 300 has been used historically (i.e., the learned element of the model 400). For example, if the user of the user device 300 typically opens an email application on weekday mornings and then opens a newspaper application immediately afterward, the model 400 learns this behavior. In this way, when the model 400 receives a set of observations indicating that it is a weekday morning and the user has opened up the email application, the model 400 can predict that the user device 300 is likely to launch a newspaper application 322 shortly thereafter (or another application in the same cluster 238 as the newspaper application), or at least that it is more probable that the user will launch a newspaper application 322 as opposed to a gaming application 322. The model 400 can output one or more probability values corresponding to different clusters that the user device 300 may transition to (including the current cluster). In some implementations, the output of the model 400 is structured in a vector, whereby each element of the vector represents a different cluster, and the value at each element is a probability that the user device 300 will transition to that cluster.

Figure 4:
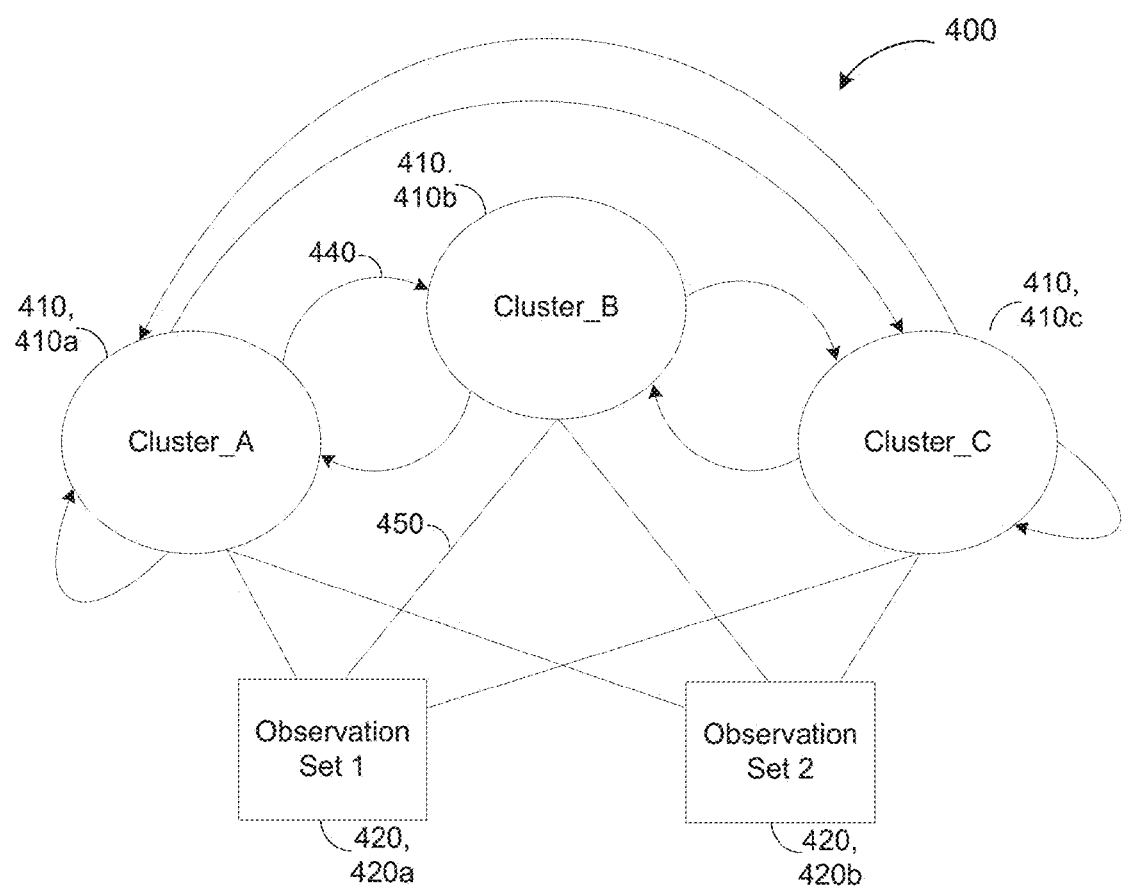
FIG. 4 is a drawing illustrating an example of a Hidden Markov Model.

FIG. 4 illustrates an example of a machine learned model 400. In the illustrated example, the machine learned model 400 is an HMM. The model 400 can include n states 410, $S=\{1, \ldots, n\}$ (e.g., clusters) and m observation sets 420, $O=[o_1, \ldots, o_{t\_max}]$ (e.g., user device states). In the illustrated example, there are three clusters 410a, 410b, 410c and user device states 420a, 420b. In the illustrated example, the arrows 440 between different clusters 410 represent state transition probabilities, and lines 450 between clusters 410 and the observations 420 represent output probabilities. The state transition probability indicates a likelihood that the user devices 300 changes from the current cluster 410 to a next cluster 410. The output probabilities represent a likelihood that a given user device state 420 corresponds to a given cluster 410. A current cluster 410 can refer to the current cluster of the user device 300 (e.g., a cluster of an application or media content currently being executed/played by the user device 300). A user device state 420 can include any number of features, including the last application launched by the user device 300, the state of the accelerometer, the location of the user device 300, the current weather conditions, the power state of the device 300, the conditions of the user device an hour ago, the conditions of the user device 30 minutes ago, or other suitable observations. The model 400 predicts the likely next cluster 410 or clusters 410 of the user device 300 given the current user device state 420 at a given time. For example, at t=0, the phone's screen is off, the previously predicted cluster 410 was "Violent Video Games," and it is 9 AM on Saturday. The model 400 has learned that on Saturday mornings, the persona 100 is likely to correlate to "watch children movies." As soon as the phone screen is turned on, based on the previous cluster 410, and the time of day and the possible personas 100, the model 400 predicts the next cluster 410 likely correlates to "watch children movies." This time, however, it is not the child, but rather the father who plays violent games, the first thing he does is launch a specific game in the "violent video game cluster." In such a scenario, the model 400 updates the current cluster 410 and then predicts the next cluster 410 corresponds to "violent video games."

The model builder 314 generates the machine learned model 400 (e.g., HMM or Bayesian model) using the cluster IDs identified in the index entries 242 as the states 410 of the model 400. In particular, the model builder 314 creates a state 410 for each cluster 238 that is to be included in the model 400. In some implementations, the model builder 314 can analyze the received index 240 to identify the set of all possible clusters 238 for the user device 300 and creates a state 410 for each identified cluster 238. In other implementations, the model builder 314 identifies the set 420 of all possible clusters 238 and selects a subset of the clusters 238, such that the selected clusters 238 collectively include all or substantially all of the items of interest of the user device 300. In these implementations, the model builder 314 may be configured to minimize the amount of intersection of items of interest between the selected clusters 238. Initially, the model builder 314 has not trained the model 400 with any data. Accordingly, at the inception of the model 400, the model builder 314 associates equal probabilities with each of the transitions from a particular cluster 410 to each of the other possible clusters 410. Furthermore, because the device 300 can reside in multiple clusters 410 at the same time (e.g., a cluster 238 for popular applications and a cluster 238 for first person shooter games), the sum of the probabilities of all of the possible transitions from a particular cluster 410 can be greater than one. In some implementations, the model builder 314 aggregates user behavior or other activity data. In these implementations, the model builder 314 utilizes the aggregated user behavior to seed the initial probabilities of the model 400, as opposed to all clusters 238 being equally probable.

The model builder 314 trains the models 400 with observations corresponding to the device 300 and the actions of the user commanding the user device 300. Examples of observations can include, but are not limited to, a current time, a day of the week, an active application (i.e., the application currently being used by the user), active media content, an active search query, the output of the accelerometer, a video signal from the camera, the type of network connection that the user device 300 is currently using, and the current location of the device 300. The types of observations used to train the model 400 can vary based on the type of the user device 300. In addition to the time of day, the day of the week, and the active application, the designer of the model 400 (e.g., a developer) can select which types of observations to include in the training data. For example, if the user device 300 is a smartphone, the peripheral devices 350 of the user device 300 may include a camera, a gyroscope, an accelerometer, and a global positioning system (GPS) receiver. In such a scenario, the model builder 314 can be configured to record the output of these peripheral devices 350. The output of the gyroscope, accelerometer, and/or GPS devices can be used to infer whether the user device 300 is in transit, and if so, what type of transit (e.g., running, walking, driving). Similarly, the output of the camera can be used to infer the identity of the user of the device 300 (e.g., mother, father, or child).

Examples of actions of a user commanding the user device 300 can include a command to turn the device 300 on, a command to launch an application 322, a command to play a media content 326, and/or a command to provide a search query 324 to a remote server. Further, the lack of a command from the user can be interpreted as an instruction to continue performing the same function or activity. The model builder 314 treats each of these commands as transitions between clusters 410 (e.g., from the home screen to an application, from an application to another application, and playing a media file from a media player application). Each time the current cluster 410 of the user device 300 transitions (e.g., the user device 300 launches a new application or sends a search query 324), the model builder 314 updates the model 400 with the observation, the cluster 410 to which the user device 300 transitioned, and the cluster 410 from which the user device 300 transitioned. When the model builder adds new data (e.g., observed conditions and state transitions) to the HMM 400, the model builder 314 can calculate new probabilities for all or some of the potential state transitions from the previous cluster 410 of the user device 300.

The behavior monitor 316 monitors the user device 300 and the commands issued by the user. The behavior monitor 316 can execute as a background process. The behavior monitor 316 may be configured to monitor the network interface 330, the user interface 340, the peripheral devices 350, and/or any applications being executed by the processing device 310. The behavior monitor 316 can maintain a set of current observations based on the monitoring. For example, the behavior monitor 316 can monitor whether the user device 300 is communicating over Wi-Fi or over a cellular network, the output of the accelerometer of the user device 300 over a recent period of time, the most recent GPS coordinates of the user device 300, and/or an image captured by the camera of the user device 300.

The behavior monitor 316 further monitors the current cluster 410 of the device 300. The current state 410 of the user device 300 can define an action currently being performed on the user device 300. The current cluster 410 of the device 300 can be represented using a cluster ID corresponding to the cluster 238 that is currently implicated by the user device 300. In some scenarios, the current action may implicate more than one cluster (e.g., an application belongs to a "violent games" cluster and a "popular games" cluster). The behavior monitor 316 can identify the current cluster 410 by determining the active application 322, active media content 326, or active search query 324 and referencing the corresponding index entry 242 of the inverted index 240. The inverted index 240 outputs the cluster ID or IDs of the cluster 238 or clusters 238 to which the active application 322, active media content 326, or active search query 324 belongs. The behavior monitor 316 can provide the set of observations to the model builder 314 and the persona predictor 318.

The persona predictor 318 predicts the active persona 100 of the user device 300 based on the current user device state of the user device 300. The persona predictor 318 can input the current user device state of the user device 300 to the machine learned model 400, and the model 400 outputs a set of probabilities. Each probability is associated with a different cluster 238. In an example implementation, the model 400 can output a vector, AP, in the form of $<P(C_J \rightarrow C_0), P_1(C_J \rightarrow C_1), P_1(C_J \rightarrow C_2), \ldots P_N(C_J \rightarrow C_{N-1}))>$ where there are N possible clusters that the user device 300 can transition to from the current cluster, $C_J$, of the device 300, including remaining in the current cluster (i.e., $C_J \rightarrow C_J$). In some implementations, the active persona 100 is set equal to the output vector. Put another way, the active persona 100 can be represented by the combination of probabilities of transitioning to each possible cluster from the current cluster. In some situations, the sum of the probabilities may exceed one because the user device 300 can exist in multiple clusters at the same time. For example, if the user is watching a popular new horror movie, the popular horror movie may implicate a cluster 238 corresponding to newly released movies and a cluster 238 corresponding to horror movies.

Additionally or alternatively, the persona predictor 318 can match the vectors output by the model 400 to persona categories. Persona categories can be predetermined categories. Examples of predetermined categories can include: "productivity applications," "electronic reader applications." "zombie shooter games," "popular games," "media player applications," "shopping," "organization applications," "play kids music," "play popular TV shows," and "searching for movies." The foregoing list of categories is provided for example only and any category can be used. The persona predictor 318 can match a vector to a category in any suitable manner. In some implementations, the persona predictor 318 can reference a set of rules for matching the vector to a category. For example, a rule can state that if the probability that the user device will transition to an item of interest in a first cluster 238 is greater than 0.8, then the output vector matches to category A. Furthermore, in some implementations, the categories do not need to be "human understandable." The rules for matching a vector to a category can be learned over time by a machine learner or hard-coded.

Table 1 illustrates an example use of a model 400 (e.g., an HMM). The model 400 receives a current user device state (i.e., the current cluster of the user and features corresponding to user device 300) and determines the active persona 100 based thereon.

TABLE 1

| INPUT | | | | |
|---|---|---|---|---|
| CURRENT CLUSTER (last output) | | | | |
| Time, t | Cat1 | Cat2 | Cat3 | Cat4 |
| 0 | 0 | 0 | 0 | 0 |
| 1 | 0 | 0 | 0 | 0 |
| 2 | 0.95 | 0 | 0 | 0 |
| 3 | 0 | 1 | 0 | 0 |
| ... | | | | |
| N | 0 | 0 | 0 | 0.95 |
| Features | | | | |
| Cluster 5 minutes ago | | | | |
| Time, t | Cat1 | Cat2 | Cat3 | Cat4 |
| 0 | 0 | 0 | 0 | 0 |
| 1 | 0 | 0 | 0 | 0 |
| 2 | 0 | 1 | 0 | 0 |

TABLE 1-continued

| | | | | |
|---|---|---|---|---|
| 3 | 0 | 0 | 0 | 0 |
| ... | | | | |
| N | 0 | 0 | 0 | 0 |

Features

| | Cluster 30 minutes ago | | | |
|---|---|---|---|---|
| Time/step | Cat1 | Cat2 | Cat3 | Cat4 |
| 0 | 0 | 0 | 0 | 0 |
| 1 | 0 | 0 | 0 | 0 |
| 2 | 0 | 1 | 0 | 0 |
| 3 | 0 | 1 | 0 | 0 |
| ... | | | | |
| N | 0 | 0 | 0 | 1 |

Features

| | Device features | | |
|---|---|---|---|
| Time, t | Idle | Screen | Accelerometer |
| 0 | 1 | 0 | 0 |
| 1 | 1 | 0 | 0 |
| 2 | 0 | 1 | 0 |
| 3 | 1 | 0 | 1 |
| ... | | | |
| N | 0 | 1 | 1 |

| | User-location in the past 30 minutes | | | | |
|---|---|---|---|---|---|
| Time, t | Moving fast? | Still? | At Loc 1 | At Loc2 | At Loc3 |
| 0 | 0 | 1 | 1 | 0 | 0 |
| 1 | 0 | 1 | 1 | 0 | 0 |
| 2 | 0 | 1 | 1 | 0 | 0 |
| 3 | 0 | 0 | 1 | 0 | 0 |
| ... | | | | | |
| N | 1 | 0 | 0 | 1 | 0 |

Time

| Time, t | Away from home? | 0-6 | 6-9 | 9-12 | 12-15 | 15-18 | 18-21 | 21-24 | DOW |
|---|---|---|---|---|---|---|---|---|---|
| 0 | 0 | 1 | 0 | 0 | 0 | 0 | 0 | 0 | M |
| 1 | 0 | 0 | 1 | 0 | 0 | 0 | 0 | 0 | M |
| 2 | 0 | 0 | 1 | 0 | 0 | 0 | 0 | 0 | M |
| 3 | 0 | 0 | 1 | 0 | 0 | 0 | 0 | 0 | M |
| ... | | | | | | | | | |
| N | 1 | 0 | 1 | 0 | 0 | 1 | 0 | 0 | F |

Output

| | NEXT STATE | | | |
|---|---|---|---|---|
| Time, t | Cat1 | Cat2 | Cat3 | Cat4 |
| 0 | 0.1 | 0.1 | 0.1 | 0.1 |
| 1 | 0.8 | 0.15 | 0 | 0.05 |
| 2 | 0 | 0.95 | 0 | 0 |
| 3 | 0 | 0.95 | 0 | 0 |
| ... | | | | |
| N | 0 | 0.1 | 0.8 | 0.1 |

In the example of Table 1, the user device can operate in four or more clusters 410 (e.g., Cat1="News and Weather," Cat2="Game Mode," Cat3="Entertainment," Cat4="Productivity Apps" . . . ). Each of the clusters 410 can correspond to different sets of items of interest (e.g., applications, media contents, and/or queries). Furthermore, Table 1 provides information regarding N or more different times (t=0, t=1, t=2, t=3 . . . t=N). The model 400 receives, as input, the current cluster of the user device 300 (e.g., the current category being used by the user). The model 400 further receives an observation set 420 (i.e., features corresponding to the user and/or the user device 300). In the example of Table 1, the model 400 receives previous clusters of the user device 300 (e.g., the cluster of the user device five minutes ago and thirty minutes ago), a present location of the device 300 (e.g., the location in the previous thirty minutes), whether the device 300 is moving quickly at the present location (e.g., is the accelerometer signal indicative of a speed greater than a threshold speed), the status of the screen, the status of the accelerometer, and the status of the device 300 (e.g., idle/in use).

In the illustrated example, at t=0 (i.e., Monday morning between midnight and 6:00 AM), the device 300 is idle and is not accelerating. The user is "quiet" and there is no strong prediction as to the category of the device 300. Thus, the active persona 100 may be represented as <0.1, 0.1, 0.1, 0.1 . . . >. At t=1 (i.e., Monday morning at 6 AM), the user is idle but the model 400 is most likely in Cat1 (e.g., "News and Weather"), but also may be in Cat2 (e.g., "Games"). Thus, the active persona 100 may be represented by <0.8, 0.15, 0, 0.05 . . . >. The foregoing active persona 100 may be learned by the model 400 if the user typically checks the news and/or the weather upon waking up, but sometimes plays a game. At t=0 (i.e., Monday morning at 7:00 AM), the user is active and currently playing a game. The output of the model 400 changes to predict that the user is in Cat2 (e.g., "Games"). In this instance, the prediction at t=1 was incorrect. The model builder 314 can update the model 400 accordingly, such that the next time the user device 300 encounters the same or similar observation set 420, the probability that the user is operating in a game mode is increased. At t=3 (i.e., Monday morning at 8:00 AM), the user device 300 is at Loc1 (e.g., the home of the user) and moving, but not moving fast (i.e., the accelerometer signal is on, but does not exceeds a threshold). At t=3, the model 400 outputs a prediction that the user device 300 is likely in Cat2 (e.g., gaming). The active persona 100 may be <0, 0.95, 0, 0, . . . >. At t=N, (i.e., Friday at 5:00 PM) the user device 300 is idle, but the user is moving fast. In this scenario, the user may be driving home from work (Loc2). At t=5, the user has used the productivity applications (e.g., email application) in the previous three hours. The model 400 predicts that the user is likely to switch to Cat3 (e.g., "Entertainment), and is less likely to play a game or use a productivity application (each with a 10% probability). At t=5, the active persona 100 may be <0, 0.1, 0.8, 0.1 . . . >. The example of Table 1 is not intended to limit the scope of the disclosure. The category lists and the features are provided for example and additional alternative categories and features may be implemented in the model 400.

The active persona 100 of the user device 300 can be used for many different functions. In some implementations, a search application can request the active persona 100 from the persona predictor 318 when the search application is launched or otherwise made active. The persona predictor 318 provides an active persona 100 of the user device 300 to the search application, which in turn includes the active persona 100 with the metadata of the search query 324. In this way, when the search engine 120 executes the search using the search query 324, the active persona 100 can provide additional context to the search query 324. For example, if the search query 324 is ("watch lions") and the active persona 100 indicates that the user is more likely (e.g., 0.8 probability) searching for sports related content than searching for children's educational content (0.05), the search engine 120 can return search results that indicate applications that allow users to watch live sports (e.g., watch the Detroit Lions play football) over applications that have animal related videos (e.g., watch videos of lions). In this situation, the persona predictor 318 can continue to update the active persona 100 of the user device 300 as the active persona 100 changes.

In another example, the user may be using a free application (e.g., music streaming application) that derives revenue from displaying ads to users. In this example, an application server 130 of the free application can request the active persona 100 of the user from the persona predictor 318. The persona predictor 318 can provide the active persona 100 to the application server 130. In response to the active persona 100, the server 130 can select an advertisement to provide to the user based on the active persona 100. For instance, if the active persona 100 indicates that the user is likely to watch a popular TV show after listening to music, the free application can display or stream an ad for a new popular TV show. Alternatively, if the active persona 100 indicates that the user is likely to play a violent video game after listening to music, then the application server 130 may provide an ad for a new first person shooter game.

In yet another example, the operating system of the user device 300 may request the active persona 100 of the user device 300. The persona predictor 318 can provide the active persona 100 to the operating system, which can use the active persona 100 to reconfigure the home screen displayed by the user interface 340. For instance, if the active persona 100 indicates that the user is likely to watch a movie, the operating system can reconfigure the home screen to display the media player application icons prominently. Alternatively, if the active persona 100 indicates that the user is likely to open email or use a document viewer, the operating system can reconfigure the home screen to display business-related application icons prominently.

The active persona 100 can be used for any other number of functions. In this way, the use of active personas 100 can enhance the user experience of the user device 300. Furthermore, in some implementations the user can manually select his or her active persona 100. In these implementations, the user can input his or her active persona 100 via a graphical user interface of the user device 300. The user device 300 can then use the manually inputted active persona 100 in any of the manners described above.

Figure 5:
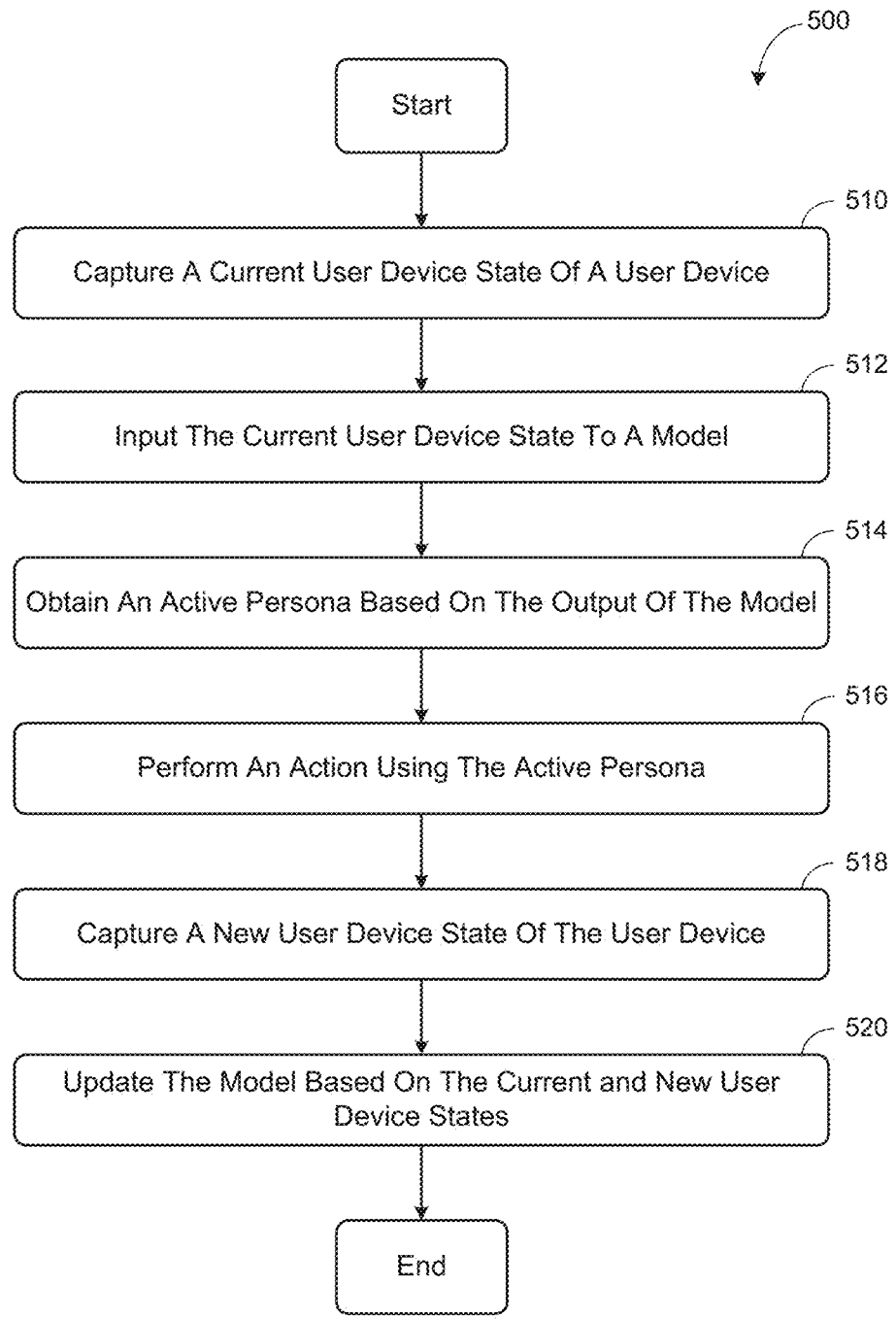
FIG. 5 is a flow chart illustrating an example set of operations for a method for determining an active persona of a user device.

Referring now to FIG. 5, an example method 500 for predicting an active persona 100 of a user device 300 is illustrated. The method 500 is explained with reference to the components of the user device 300. It is understood that any other suitable components may execute the method 500.

At operation 510, the behavior monitor 316 captures a current user device state of a user device 300. In order to determine the current user device state of the user device 300, the behavior monitor 316 determines what the active process of the user device 300 is to capture the current state 410. That is, the behavior monitor 316 can identify the active application 322, active media content 326, or active search query 324. The behavior monitor 316 then references the inverted index entry 242 of the active process to identify the cluster ID or IDs of the clusters 238 implicated by the active process. The cluster ID or IDs represent the current user device state 410 or states 410 of the user device 300. As discussed, the persona server 200 may select the index entries 242 so as to minimize collisions, but there may be overlap between one or more clusters 238.

In addition to the active process, the behavior monitor 316 captures the current observations of the user device 300. The behavior monitor 316 can capture the states of the network interface device 330, the user interface 340, and/or the peripheral devices 350. For example, the behavior monitor 316 can determine whether the user device 300 is operating on a Wi-Fi network or on a cellular network, the output of the accelerometer over a previous amount of time (e.g., five minutes), the output of the GPS system, the time of the day, and the day of the week. Depending on the capabilities of the device 300 and other considerations, the behavior monitor 316 can capture other current observations as well, including a current temperature, the output of the video camera, and the amount of ambient light. The behavior monitor 316 can maintain a current observation data structure that defines the set of observations that the behavior monitor 316 captures. Each time the behavior monitor 316 captures a new observation, the behavior monitor 316 can update the data structure with the new observation.

At operation 512, the persona predictor 318 inputs the current user device state into a model 400. At operation 514, the persona predictor 318 obtains the active persona 100 from the model 400. In some implementations, the model 400 outputs one or more vectors of probabilities. As previously indicated, each probability is associated with a different cluster and indicates a likelihood that the user device 300 will transition to an item of interest corresponding to the cluster. In some implementations, the active persona 100 or personas 100 are set equal to the output vector or vectors. In other implementations, the persona predictor 318 matches the vector to an active persona category to obtain the active persona 100 or personas 100 of the user device 300.

At operation 516, the persona predictor 318 performs a procedure using the active persona 100. In some implementations, the persona predictor 318 can provide the active persona 100 to a process executing on the user device 300 (e.g., the operating system of the user device 300) or to a remote device (e.g., application server 130 or an advertisement server). In some implementations, the persona predictor 318 can provide the active persona 100 to a search application, which in turn includes the active persona 100 in a search query 324 that it provides to a search engine 120. In some implementations, the operating system of the user device 300 can rearrange the home screen of the user device 300 in accordance with the active persona 100. For instance, if the active persona 100 indicates that the user is likely to play a violent video game, the operating system can rearrange the home screen to show icons of the violent video game on the home screen. In this way, the active persona 100 can be used to enhance the user's overall experience of the user device 300.

At operation 518, the behavior monitor 316 captures a new user device state of the user device 300. The behavior monitor 316 can monitor the action of the user of the user device 300 after the persona predictor 318 predicts the active persona 100. In some implementations, the behavior monitor 316 waits until the user device 300 changes the current active process (e.g., the user transitions to a different application or media content 326) to capture the new user device state. If the user does not change the active process for a timeout period (e.g., five minutes), the behavior monitor 316 determines that the user device 300 remained in the same user device state. In other implementations, the behavior monitor 316 captures a new user device state of the user device 300 in intervals of predetermined length (e.g., every two minutes). In these implementations, the new user device state may be the same as the current user device state if the user device 300 does not change the active process during the predetermined interval. The behavior monitor 316 can capture other observations in addition to capturing the new active process.

At operation 520, the model builder 314 updates the model 400. In some implementations, the model builder 314 updates the training data of the model 400 with the current user device state (determined at operation 510) and the new user device state (determined at operation 520) as captured by the behavior monitor 316. In this way, the model builder 314 defines a known transition given a current user state and a subsequent new user device state.

The method 500 can execute in this manner upon receiving a request for an active persona 100 or at predetermined intervals (e.g., every five minutes when the user device 300 is in use). The method 500 is provided for example only and variations of the method 500 are contemplated. Further, some of the operations may be performed out of order or concurrently.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus," "computing device," and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). Communication networks can include cellular networks and/or telephone networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    determining, by a processing device, a first user device state of a user device, the first user device state defining an action currently being performed on the user device and one or more observations corresponding to the user device;
    inputting, by the processing device, the first user device state to a model that receives a user device state and outputs probability values associated with one or more clusters, each cluster being indicative of one or more items of interest corresponding to the user device;

determining, by the processing device, an active persona of the user device based on the output of the model, the active persona being indicative of a predicted objective of a user of the user device; and performing, by the processing device, a procedure using the active persona of the user device.

2. The method of claim 1, further comprising:

capturing, by the processing device, a second user device state after determining the active persona of the user device the second user device state being subsequent to the first user device state and defining a subsequent action being performed on the user device and one or more subsequent observations; and updating, by the processing device, the model based on the second user device state and the first user device state.

3. The method of claim 1, wherein the model is a Hidden Markov Model.

4. The method of claim 1, wherein the action being performed by the user device is based on an active process of the user device.

5. The method of claim 4, wherein the active process is one of an active application being executed by the user device, an active media content being played by the user device, or an active search query being provided by the user device.

6. The method of claim 4, wherein determining the first user device state includes determining an active cluster to which the active process corresponds using an inverted index, the active cluster being indicative of an active item of interest corresponding to the user device.

7. The method of claim 6, further comprising:

determining, by the processing device, a plurality of items of interest of the user device, each item of interest indicating one of an application installed on the user device, a media content previously played on the user device, or a search query previously provided from the user device;

providing, by the processing device, the plurality of items of interest to a persona server; and receiving, by the processing device, the inverted index from the persona server, the inverted index containing a plurality of inverted index entries, each inverted index entry corresponding to one of the items of interest and identifying one or more clusters to which the item of interest belongs.

8. The method of claim 1, wherein determining the first user device state includes obtaining output values of one or more peripheral devices of the user device.

9. The method of claim 1, wherein performing the procedure using the active persona includes communicating the active persona to a search engine as part of a search query.

10. The method of claim 1, wherein performing the procedure using the active persona includes communicating the active persona to an application server in communication with the user device.

11. The method of claim 1, wherein performing the procedure using the active persona includes rearranging a home screen of the user device based on the active persona.

12. The method of claim 1, wherein the active persona is a vector indicating the probabilities output by the model, wherein each element of the vector indicates a probability that the user device will transition from a current item of interest to a cluster associated with the probability value that contains a second item of interest.

13. The method of claim 1, wherein obtaining the active persona includes:

obtaining a vector indicating the probabilities output by the model, each element of the vector indicating a probability that the user device will transition from a current item of interest to a cluster associated with the probability value that contains a second item of interest; and mapping the vector to a category based on one or more rules.

14. A user device comprising:

a storage device including one or more computer readable mediums that store a model that receives a user device state of a user device and outputs probability values associated with one or more clusters, each cluster being indicative of one or more items of interest corresponding to the user device; and a processing device, the processing device executing computer-readable instructions that when executed by the processing device cause the user device to:

determine a first user device state of the user device, the first user device state defining an action currently being performed on the user device and one or more observations corresponding to the user device;

input the first user device state to the model;

determine an active persona of the user device based on the output of the model, the active persona being indicative of a predicted objective of the user of the user device; and perform a procedure using the active persona of the user device.

15. The user device of claim 14, wherein the computer readable instructions further cause the processing device to:

capture a second user device state after determining the active persona of the user device the second user device state being subsequent to the first user device state and defining a subsequent action being performed on the user device and one or more subsequent observations; and update the model based on the first user device state and the second user device state.

16. The user device of claim 14, wherein the model is a Hidden Markov Model.

17. The user device of claim 14, wherein the action being performed by the user device is based on an active process of the user device.

18. The user device of claim 17, wherein the active process is one of an active application being executed by the user device, an active media content being played by the user device, or an active search query being provided by the user device.

19. The user device of claim 18, wherein determining the first user device state includes determining an active cluster to which the active process corresponds using an inverted index, the active cluster being indicative of an active item of interest corresponding to the user device.

20. The user device of claim 19, wherein the computer readable instructions further cause the processing device to:

determine a plurality of items of interest of the user device, each item of interest indicating one of an application installed on the user device, a media content previously played by the user device, or a search query previously provided from the user device;

provide the plurality of items of interest to a persona server; and receive the inverted index from the persona server, the inverted index containing a plurality of inverted index entries, each inverted index entry corresponding to one of the items of interest and identifying one or more clusters to which the item of interest belongs.

21. The user device of claim 14, wherein determining the first user device state includes obtaining output values of one or more peripheral devices of the user device.

22. The user device of claim 14, wherein performing the procedure using the active persona includes communicating the active persona to a search engine as part of a search query.

23. The user device of claim 14, wherein performing the procedure using the active persona includes communicating the active persona to an application server in communication with the user device.

24. The user device of claim 14 wherein performing the procedure using the active persona includes arranging a home screen of the user device based on the active persona.

25. The user device of claim 14, wherein the active persona is a vector indicating the probabilities output by the model, wherein each element of the vector indicates a probability that the user device will transition from a current item of interest to a second item of interest indicated by a cluster associated with the probability value.

26. The user device of claim 14, wherein obtaining the active persona includes:
- obtaining a vector indicating the probabilities output by the model, each element of the vector indicating a probability that the user device will transition from a current item of interest to a second item of interest indicated by a cluster associated with the probability value; and
- mapping the vector to a category based on one or more rules.

\* \* \* \* \*